INVENTOR.
DONALD K. REX
BY Joseph B. Taplow
ATTORNEY

April 8, 1958 D. K. REX 2,829,593

WIRE PRINTER

Filed Dec. 30, 1954 3 Sheets-Sheet 2

INVENTOR.
DONALD K. REX

BY Joseph B Tapham

ATTORNEY

April 8, 1958 D. K. REX 2,829,593

WIRE PRINTER

Filed Dec. 30, 1954 3 Sheets-Sheet 3

INVENTOR.
DONALD K. REX

BY

Joseph B. Tapham
ATTORNEY

United States Patent Office 2,829,593

Patented Apr. 8, 1958

2,829,593

WIRE PRINTER

Donald K. Rex, Endicott, N. Y., assignor to International Business Machines Corporation, New York, N. Y., a corporation of New York Application December 30, 1954, Serial No. 478,787

14 Claims. (Cl. 101—93)

This invention relates to printing machines and more particularly to printing machines wherein the impression determining element, such as the code rod in wire printers, is positioned on the basis of one or more of a possible number of distinct manifestations, such as electrical impulses.

The object of this invention is to provide a printer embodying a self-checking scheme. A more specific object of the invention is the provision of a self-checking scheme that possesses a high degree of effectiveness but yet is simple and inexpensive of construction.

It has heretofore been proposed in data processing machines, wherein characters are represented by electrical impulses or bits, to add a check impulse or redundant bit to those representations whose number of bits is even or odd, as the choice may be. (See "High Speed Computing Devices" by the staff of ERA, Inc., First Edition, 1950.) The net result is that in a particular machine the control impulses or bits for the respective characters are either all even or all odd in number, and any change in the odd- or even-ness, that is, departure from the standard selected, may be used as an indication of an error.

According to the present invention, the presence or absence of the redundant bit, that is, the odd- or even-ness of the group of bits representing each particular character, is advantageously utilized in conjunction with the printer element whose positioning determines the actual character that will be impressed. Since the number of impulses or bits actually designative of each character is predetermined according to the code employed, the final impression determining element may be so formed as to indicate whether the characters corresponding to the various positions in which it may be disposed are normally designated by odd or even numbers of impulses or bits. This indication may then be compared with the presence or absence of the redundant bit with the control impulses or bits on the basis of which the impression determining element was positioned. If a discrepancy exists, an error has occurred, and an indication thereof may be used to stop the machine or perform any other desired function.

Other objects of the invention will be pointed out in the following description and claims and illustrated in the accompanying drawings, which disclose, by way of example, the principle of the invention and the best mode which has been contemplated of applying that principle.

The invention has been shown as embodied in a wire printer of the type disclosed in the copending U. S. patent application Serial No. 255,391 of Reynold B. Johnson, filed November 8, 1951 and now United States Patent No. 2,730,040, issued January 10, 1956. In that wire printer, a code rod 10, disposable in any of forty-seven positions in addition to a home position and thus capable of selectively effecting the printing of forty-seven distinct characters in addition to a blank, is controlled by six magnets, respectively denominated A, B, C, D, E, and F. These magnets are adapted to be energized by any of six distinct electrical impulses or bits, and according to the code shown in Fig. 12 of that application and Fig. 3 of this application, the number of impulses respectively designating the different characters may range from one through five. Thus, the number of impulses or bits for each character varies between an odd and an even count, and in a data processing machine an extra or redundant bit may be added according to whether, in the particular scheme employed, the number of control bits for the different characters is odd or even. In the instant embodiment it has been decided to show the invention as being used in a system wherein a redundant bit is added when the number of bits actually designative of a particular character is odd, thus providing that each character representing group of bits will be even in number. For the purposes of this invention, it could just as well have been decided to have the final group count odd as in the book aforementioned. However, since this book has been published, there has been a trend towards the use of even-numbered bit groups, and in conformity therewith, this invention is particularly described for use in such even-numbered schemes.

Figure 3:
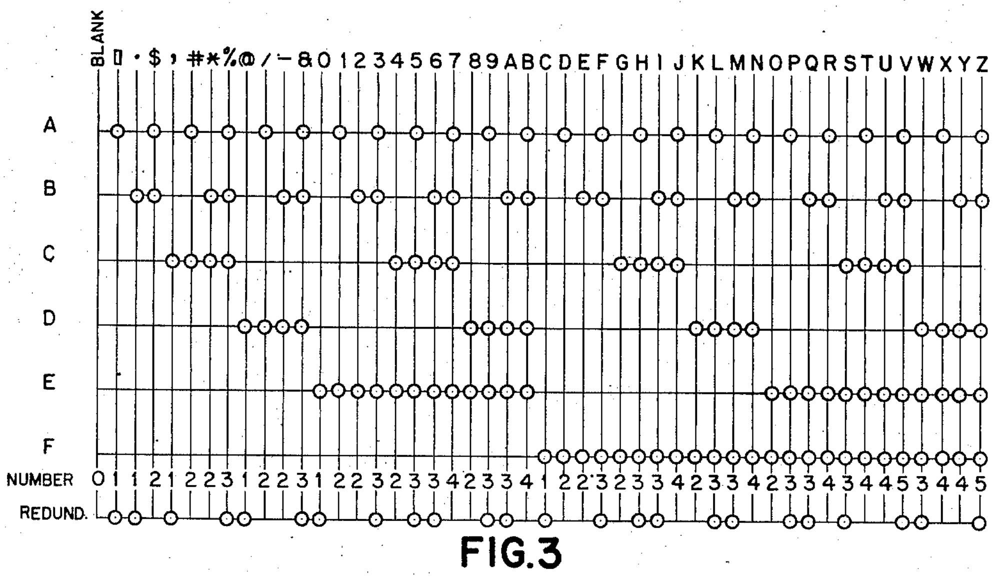
Fig. 3 is a chart depicting a six-position code according to which the various characters are designated as well as the number of the bits designative of each character and whether such designations are accompanied by a redundant bit.

In wire printers it has become conventional to move a code rod against the aligned control ends of print wires 12 to impart a differential setting thereto prior to the subjection of the print ends of such print wires to a printing impact. In carrying out this invention, it is proposed to provide an additional wire 14 which may be controlled by the code rod in each of its various positions. Just as with the print wires for which high and low portions, 16 and 18, respectively, on the code rod are used to effect selective longitudinal displacement thereof, additional high and low portions, 20 and 22, respectively, formed on a slightly extended code rod are used to position the additional wire 14. If the character corresponding to the position in which the code rod is disposed is designated by an odd number of impulses, as shown in Fig. 3, a low portion is formed on the code rod 10 so that it will be aligned with the additional wire 14. Thus, no displacement of the additional wire 14 will take place when the code rod is moved against the control ends of the print wires to preset them. On the other hand, if the character corresponding to the position in which the code rod was disposed is designated by an even number of impulses or bits, a high portion is provided on the code rod so that it will be aligned with the additional wire. Hence, the additional wire will now be displaced when the code rod is moved against the print wires to preset them. Summarizing, if the character corresponding to the position of the code rod is designated by an even number of bits, the additional wire 14 is displaced; if the number of bits is odd, the wire 14 is not displaced for it enters the hole formed by a low portion of the rod. Hence, the wire 14 is not displaced when a redundant bit should have been present with the group of control impulses or bits on the basis of the character corresponding to the actual positioning of the code rod.

Figure 1:
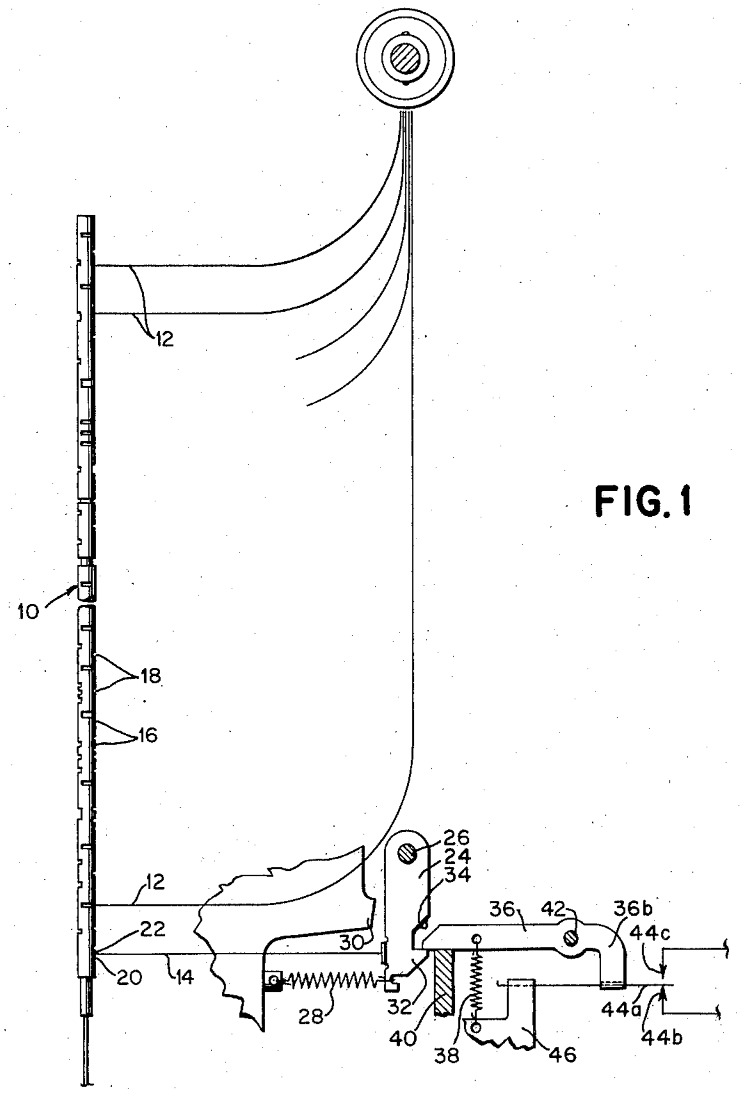
Fig. 1 is a view, in longitudinal vertical section, of a wire printer embodying the invention.

The displacement or lack thereof of additional wire 14 is utilized to control the operation of a set of transfer contacts 44. As shown in Fig. 1, the additional or check wire 14 also engages the free end of a lever 24. This lever, which may be pivoted on a rod 26, is biased by a spring 28 towards a position in which it rests against a stop 30 and a hook 32 thereon, formed by cutting away a portion as at 34, is clear of the free end of a contact operating lever 36. While the normal position of the lever 24 is in engagement with the stop 30, the lever 36 is normally prevented from moving under the influence of its spring 38 by a bail element 40. This bail element, however, is moved away from the normal position of the lever 36 while the code rod 10 is still in engagement with the print wires which it has preset. This bail element movement allows the lever 36 to rotate if it is not held by the lever hook 32 to where it transfers the contacts 44. To this end the lever 36 is provided with an extension 36*b* which actually moves a common strap 44*a*, fixed at one end to a support 46 also serving as an anchor for the spring 38, from engagement with the transfer contact element 44*b* to engagement with the transfer contact element 44*c*.

After effecting a transfer of the contacts 44 for a time sufficient to create an impulse indicating that a redundant bit should have been present with the control impulses supplied to the code rod control magnets A, B, C, D, E, and F on the basis of the actual positioning of the code rod, the bail 40 immediately restores so as to permit restoration of the code rod. The lever 24 and the check wire 14 will restore with the code rod until the lever is interrupted by the stop 30.

It should be observed that, when a low portion 20 indicative of the need for a redundant bit is aligned with the wire 14, the contacts 44 will be transferred by operation of the bail 40, and that when a high portion 22 is aligned with the wire 14, the lever 36 will be prevented from following the bail 40 to transfer the contacts 44. In other words, the actual positioning of the code rod determines whether the contacts 44 transfer or not to indicate that, on the basis of the code rod positioning, the control impulses should or should not have included a redundant bit.

Figure 2:
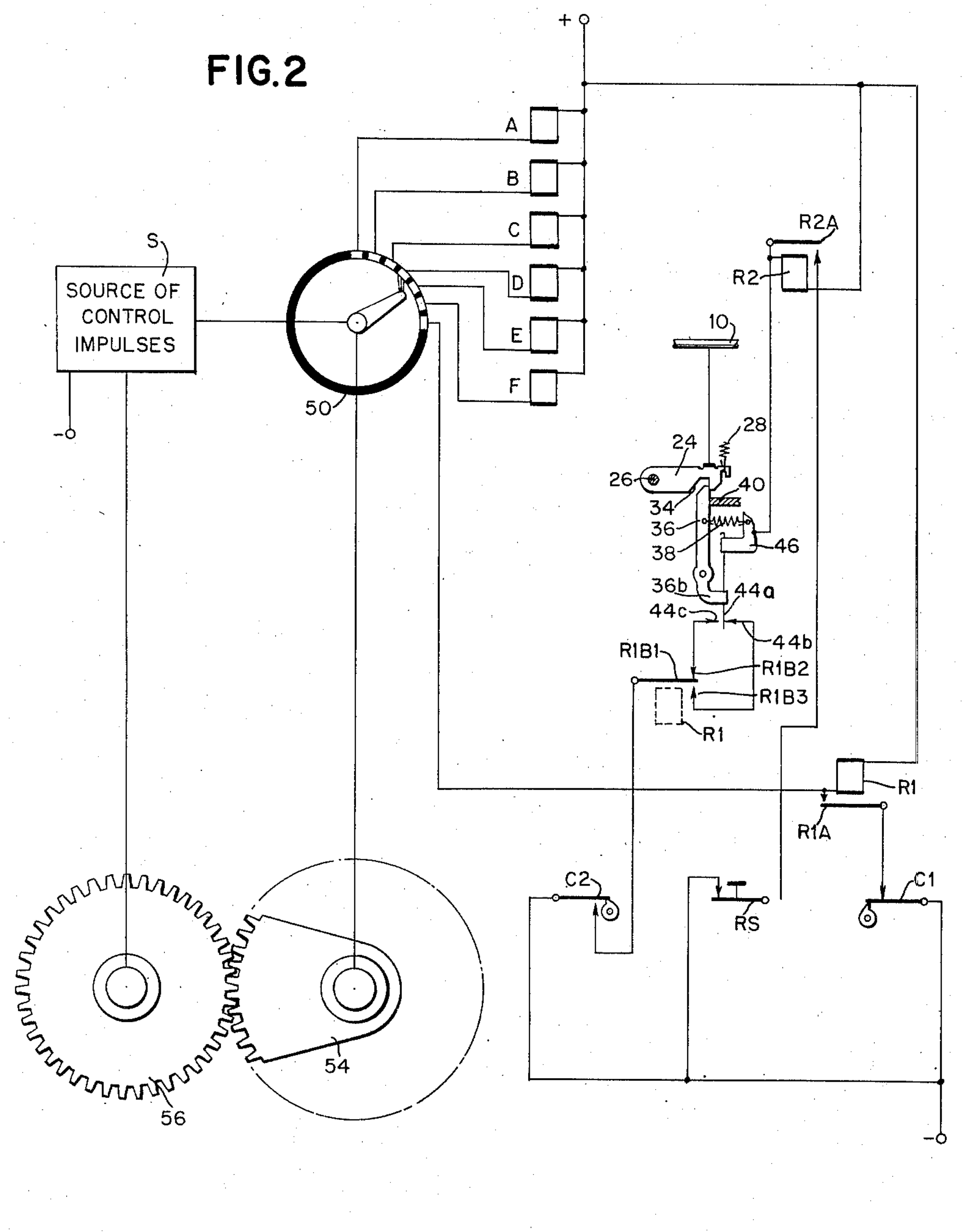
Fig. 2 is a diagrammatic wiring diagram for the wire printer disclosed in Fig. 1.

The actual presence or absence of the redundant bit may be checked for by the circuitry outlined in Fig. 2. Conveniently, an emitter 50 is provided to distribute the control impulses or bits originating from a source S which may be a magnetic tape, paper tape, punched card, etc. The reading of the tape may be synchronized with the sweep of the emitter brush 52 past its conductive segments as by a gear segment 54 operative to drive a gear 56 associated with the source S during that portion of a cycle that the brush sweeps by the conductor segments. Thus, in using a six-position code to designate the different characters, the emitter brush would first sweep by the conductor segments electrically connected with the magnets A, B, C, D, E, and F which control the positioning of the code rod 10. The seventh pulse, if it exists, would be the check pulse or redundant bit, which would pass the seventh conductor segment to momentarily energize a relay R1. Relay R1 would hold by closing its contacts R1A in circuit with the now-closed continuously-operated cam contacts C1 which break at a later point in the cycle to drop out the relay R1. This dropping out of the relay R1 does not occur, however, before the bail 40 has moved to permit a transfer of the contacts 44. Thus, it can be seen that the presence of a redundant bit is stored for later comparison with the actual conditioning of the print wires 12.

The accuracy of the code rod positioning may be checked when the bail 40 is operated to permit transfer of the contacts 44. If a redundant bit was present with the control impulses and relay R1 was energized, the strap R1B1 of transfer contacts R1B controlled by relay R1 would have been transferred from engagement with points R1B2, in series with the point 44*c* of transfer contacts 44, to engagement with the contact point R1B3 in series with the contact point 44*b*. If the code rod was positioned so that the character for that position is designated by an odd number of bits, the strap 44*a* would have been transferred in the manner aforementioned so that it engaged contact point 44*c*. Hence, when contacts C2, in circuit with the strap R1B1, close, no circuit would be completed through a machine-controlling relay R2, as the circuit would be open at the contact points 44*b* and R1B2. On the other hand, if the character corresponding to the position in which the code rod is positioned is designated by an even number of bits, the strap 44*a* would not have been transferred, with the result that relay R2 would be pulsed upon the momentary closing of contacts C2. Relay R2 would hold by closing its contacts R2A in series with a normally closed reset switch RS.

In those situations wherein the control pulses are not accompanied by a redundant bit, relay R1 will not be energized. Hence, the strap R1B1 will not be transferred, and if the character corresponding to the code rod position is designated by an even number of bits, the strap 44*a* will not be transferred, with the result that the circuit through the contacts C2 and relay R2 will be open at the contact point 44*c* as well as the contact point R1B3. If, however, the character just mentioned were designated by an odd number of bits, the strap 44*a* would have been transferred to complete a circuit to the relay R2.

The relay R1 is dropped soon after relay R2 might have been picked up by the closing of the contacts C2. This is accomplished by the opening of the contacts C1 in the hold circuit of relay R1, as a momentary deenergization of relay R1 is sufficient to permit an opening of the normally open contacts R1A controlled by it. It may be observed that the relay R2 remains energized even though the machine continues operation after it has been picked up to cause the contacts C1 to open and drop out relay R1. Relay R2 would remain energized until either the power was disconnected from the machine or the reset switch RS is depressed.

Figure 4:
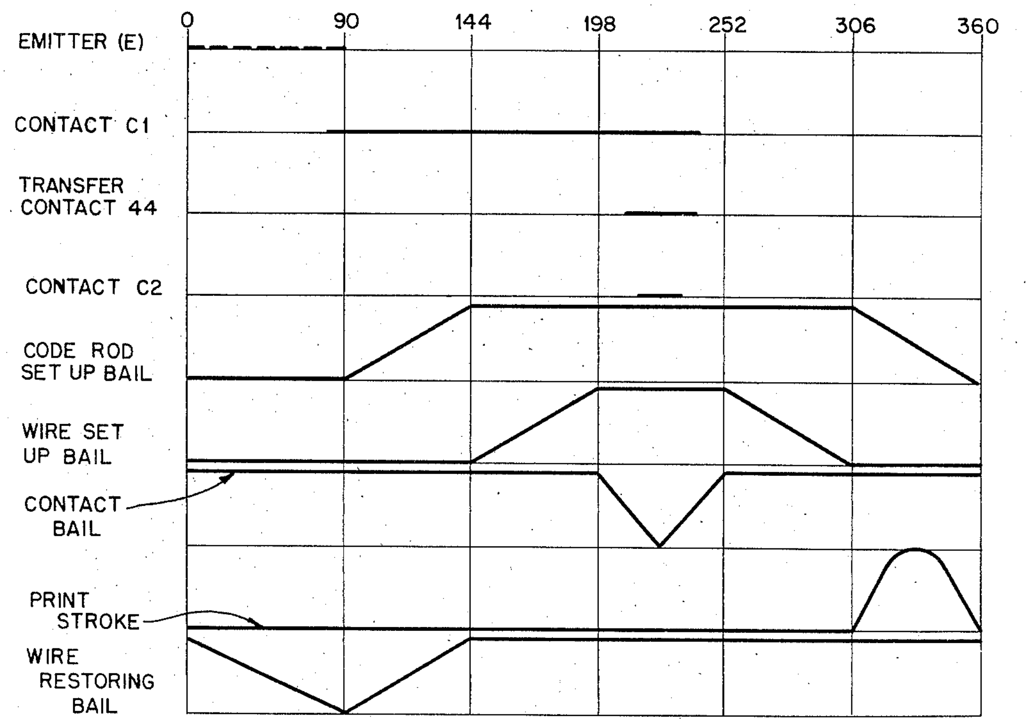
Fig. 4 is a chart depicting the timing of various parts of the printer constructed disclosed in Figs. 1 and 2.

The cyclical operation of the printer above described may be as follows:

In a cycle which has been arbitrarily designated as starting when the emitter brush 52 first makes contact with the conductor segment electrically connected with the print magnet A, the first 90° of the cycle may be devoted to the distribution of impulses from the source S to the respective print magnets and the redundant bit relay R1. The emitter brush is synchronized for rotation with the gear segment 54 fixed to the drive shaft so that the latter will be effective to drive the source through the gear 56 during the first fourth of the cycle. Thus, one or more of the print magnets A through F could be energized by 90° of cycle time as well as the redundant bit relay R1 which would hold through the now closed contacts C1, and a code rod setup bail (not shown) could be operated in the next 54° of cycle time to position the code rod according to the control impulses. Once the code rod has been positioned, it is moved against the controlled ends of the print wires by a wire setting bail (not shown), and the print wires could be differentially preset by 198° of cycle time. The code rod does not immediately restore but remains in this displaced condition to allow operation of the contact bail 40. This operation may begin at 198° of cycle time and reach a maximum displacement at 225° of cycle time, thereafter immediately returning so that it is fully restored by 252° of cycle time. The operation of this bail permits the transfer of the contacts 44, as indicated by the timing chart of Fig. 4. During the time that the contacts R44 may be transferred, the contacts C2 close to permit the pulsing of the printer-controlling relay R2. Should the even- or odd-ness of the number of designating pulses for the character corresponding to the code rod position fail to correspond with the absence or presence of the redundant bit, the relay R2 would be energized and could be used to stop the printer.

On the other hand, if there was correspondence, the printer would continue operation and, after the dropping of relay R1 by the opening of contacts C1, the wire setup bail would be returned to its original position to remove the code rod 10 from engagement with the print wires 12 and the check wire 14. (Of course, the energization of relay R2 could be used to stop the printer later, for example, after printing has been accomplished in order to facilitate trouble-shooting.) This action might be completed by 306° of cycle time, and thereupon the restoration of the code rod setup bail may be begun. Also since the print wire setup has now been restored and is no longer in contact with the print wires, the print wires may be subjected to a print stroke in which they undergo a partial restoring displacement. During the first 90° of the next cycle, a wire restoring bail (not shown) may be operated to fully restore the preset print wires, and immediately thereafter it would be restored to a position permitting a re-setup of the print wires by the code rod.

Evidently, then, there has been provided a simple and cheap and yet reliable means for checking the accuracy of the printer. If the code rod is not being properly positioned on the basis of the control impulses which are supplied to it, as for example, because of the failure of a print magnet, this defect, if not immediately, will soon thereafter be discovered through the positioning of the code rod to print a character designated by an odd or an even number of control impulses when the control impulses are even or odd and accompanied by a redundant bit. The machine will do more than that, however. It will also detect the omission or improper addition of an impulse to the control impulses, particularly when the defect is of a repetitive nature, which will result in the positioning of the code rod to an odd or an even character designation when the control pulses are even or odd, respectively. It should also be observed that this device is located as close to the platen or final machine operation as is physically possible, with the result that the operation of the whole machine is automatically checked.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine, means for representing characters by groups of signals of which some are indicative of the nature of the group, first means conditionable according to some of the signals of each group to indicate the nature thereof, second means conditionable according to other of the signals of those groups and indicating the nature of the group which should have conditioned it, and third means for comparing the correspondence of indicated conditioning between the first and second means and for signalling that a discrepancy obtains if the indications are unlike.

2. In a machine wherein characters are respectively designated by even and odd groups of signals and an extra signal is associated with the odd or the even groups to make them even or odd as the choice may be, an element conditionable according to the character designating signals of each group, a second element conditionable according to the presence or absence of the extra signal of the different groups, and means for checking whether the actual conditioning of the first element corresponds to an even or an odd number of signals in the code employed and accords with the condition of the second element.

3. In a machine whose operation is affected by its accuracy, means for representing characters by a group of signals of which some are indicative of the nature of the group, an element conditionable according to some of a group of signals to indicate the nature thereof, another element conditionable according to other signals of the group and indicating the nature of the group which should have conditioned it, means for comparing the correspondence of indicated conditioning between the two elements and for indicating the presence or absence thereof, and means responsive to said indicating means for affecting the operation of the machine.

4. In a cyclically operated machine, means for representing characters by groups of signals of which some are indicative of the nature of the group, an element conditionable in each cycle according to some of a group of signals to indicate the nature thereof, a second element conditionable in each cycle according to other of the signals of the corresponding group and indicating the nature of the group which should have conditioned it, and means for comparing in each cycle the correspondence of indicated conditioning between the elements and for signalling that a discrepancy obtains if the indications are unlike.

5. In a printer wherein characters are respectively designated by one or a combination of signals accompanied by an extra signal if the number of designating signals is odd or even as the choice may be, an element conditionable according to the character to be printed, means for conditioning said element in response to the character designating signals, a second element, means for conditioning said second element according to the presence or absence of the extra signal, and means for checking whether the character corresponding to the actual conditioning of the first element accords in the evenness or oddness of its designating signals as determined by the code employed with that indicated by the conditioning of the second element.

6. In a printer wherein different characters are successively designated by different ones or combinations of impulses which are accompanied by an extra impulse if the number of such designating impulses is odd or even as the choice may be, an element positionable according to the character to be printed, means for positioning said element in response to the character designating impulses, a second element positionable in a second position, means for positioning said second element in its second position according to the presence or the absence of the extra impulse, means controlled by the positioning of said first element for indicating whether the designation for the corresponding character according to the code employed is an odd or an even number of impulses, and means for checking whether the indication of said last mentioned means accords with that indicated by the positioning of said second element.

7. In a printer wherein different characters are successively designated by one or a series of impulses which are accompanied by an extra impulse if the number of such designating impulses are odd or even as the choice may be, an element positionable according to the character to be printed, means for positioning said element in response to the designating impulses, means positionable by said element according to whether the designations for the corresponding character in the code employed number odd or even, a second element disposable in a second position, means controlled by said extra impulse for positioning said second element, and means for comparing the correspondence of the positioning of the second element and of the means controlled by the first element.

8. In a machine wherein different characters are successively designated by one or a combination of manifestations variously combined with an additional manifestation according to a preselected code, an element conditionable according to the character represented, means controlled by said element for indicating whether the manifestations representative of the character to which it has been conditioned should in the code employed be accompanied by the additional manifestation, other means for indicating whether the manifestations for the character included the additional manifestation, and means for comparing the correspondence between the two indicating means.

9. In a printing machine wherein different characters are successively designated by one or a combination of manifestations and accompanied by another manifestation if the number of such designating manifestations is odd or even, as the choice may be, an element movable to any of a plurality of character determining positions, means positionable by said element in each of its positions according to whether the corresponding character is designated by an odd or an even number of manifestations in the code employed, means positionable according to the presence or absence of the other manifestation, and means for checking the correspondence of positioning of the other two means.

10. In a printing machine, an element positionable to effect printing of a particular character, first means for positioning said element in response to a group of one or more manifestations designating a character and combined with an extra manifestation if the number of such character-designating manifestations is odd or even as the choice may be, second means positionable by said element according to whether the corresponding character is designated by an odd or an even number of manifestations in the code employed, third means positionable according to the presence or absence of said extra manifestation, and other means for checking the correspondence of positioning of said second means and said third means.

11. In a wire printer having a plurality of print wires which are differentially displaced by movement thereagainst of a positioned code rod bearing high and low portions, an additional wire, an additional high or low portion formed on said code rod for each of its positions to cooperate with said additional wire when the rod is moved against the print wires, and means controlled by said wire for indicating whether a high or a low portion appeared on the positioned code rod opposite said additional wire.

12. In a wire printer, a plurality of print wires, a code rod bearing high and low portions positionable according to the character to be printed and thereafter movable against said print wires in order to differentially displace them, an additional wire, additional high or low portions formed on said code rod for each of its positions to cooperate with said additional wire, and means positionable by said additional wire in one or another position according to whether a high or a low portion was aligned with it when the code rod was moved against said print wires.

13. In a wire printer, a plurality of print wires, a code rod bearing high and low portions positionable according to the character to be printed and thereafter movable against said print wires in order to differentially displace them, an additional wire, additional high or low portions formed on said code rod for each of its positions according to the corresponding type of character to cooperate with said additional wire, and means engageable by said additional wire when a high portion is aligned with it and the code rod is moved against said print wires for indicating the type of character to be printed.

14. In a wire printer, a plurality of print wires a code rod bearing high and low portions positionable according to the character to be printed and thereafter movable against said print wires in order to differentially displace them, an additional wire, additional high or low portions formed on said code rod for each of its positions to cooperate with said additional wire, transfer contacts biased to a normal position and movable to a second position, first means having a normal position in which it holds the transfer contacts in the second position and movable to a second position in which it permits said transfer contacts to restore, and second means biased to a normal position in which it permits said contacts to restore but movable by said additional wire when the latter is aligned with a code rod high portion to where it prevents said contacts from restoring when said first means is moved to its second position.

References Cited in the file of this patent

UNITED STATES PATENTS

| | | |
|---|---|---|
| 1,863,098 | Borel | June 14, 1932 |
| 1,957,193 | Armbruster | May 1, 1934 |
| 2,016,709 | Eichenauer | Oct. 8, 1935 |
| 2,247,916 | Lake | July 1, 1941 |
| 2,307,109 | Bryce | Jan. 5, 1943 |
| 2,524,127 | Johnson | Oct. 3, 1950 |
| 2,627,805 | Reitfort | Feb. 10, 1953 |